United States Patent [19]

Okita et al.

[11] Patent Number: 4,967,297
[45] Date of Patent: Oct. 30, 1990

[54] MAGNETIC DISK HEAD POSITIONING DEVICE

[75] Inventors: Masao Okita; Shinichi Omori; Ryu Yunokuchi, all of Furukawa, Japan

[73] Assignee: Alps Electric Co., Ltd., Tokyo, Japan

[21] Appl. No.: 282,762

[22] Filed: Dec. 9, 1988

[30] Foreign Application Priority Data

Jan. 26, 1988 [JP] Japan .................................. 63-13677
Feb. 3, 1988 [JP] Japan .................................. 63-22070
Mar. 2, 1988 [JP] Japan .................................. 63-47388

[51] Int. Cl.$^5$ ............................................. G11B 5/55
[52] U.S. Cl. ................................. 360/106; 360/99.01
[58] Field of Search ................................ 360/102–106

[56] References Cited

U.S. PATENT DOCUMENTS

3,057,970 10/1962 Brunner .
4,595,963 6/1986 Shimaoka .................... 360/105 X

FOREIGN PATENT DOCUMENTS

63-50983 3/1988 Japan .................................. 360/106

OTHER PUBLICATIONS

IBM T.D.B. vol. 21, No. 6/1978, p. 363; 'Dual Arm Rotary Head Positioner', I. W. Bolton, et al.
IBM T.D.B. vol. 15, No. 3, 8/1972, p. 749; 'Balanced Force Voice-Coil Actuator'; N. K. Frater.

*Primary Examiner*—A. J. Heinz
*Attorney, Agent, or Firm*—Guy W. Shoup; David W. Heid

[57] ABSTRACT

A magnetic disk driving device comprising a flexible disk-shaped magnetic recording medium; a first motor for rotating the magnetic recording medium; first and second head supporting members for supporting first and second magnetic heads, respectively, the first and second head supporting members being formed with recesses from which the first and second magnetic heads project toward the magnetic recording medium; a second motor for moving the magnetic heads; and first and second arms extending along opposite surfaces of the magnetic recording medium, the first and second arms having respective free ends where the first and second head supporting members are mounted and having respective base ends where a rotating shaft of the second motor is directly fixed; wherein the first and second arms are adapted to be rocked within a predetermined rocking angle defined in such a manner that when the first magnetic head supported by the first head supporting member is located in opposition to an outermost recording track of the magnetic recording medium, the second magnetic head supported by the second head supporting member comes to a position opposed to an innermost recording track of the magnetic recording medium.

6 Claims, 3 Drawing Sheets

MAGNETIC DISK HEAD POSITIONING DEVICE

BACKGROUND OF THE INVENTION

The present invention relates to a magnetic disk driving device for recording information on, or retrieving recorded information from a disk-shaped magnetic recording medium.

A magnetic disk driving device for recording/retrieving information on/from a disk-shaped magnetic recording medium (which will be hereinafter referred to as a disk) is widely used as an external storage for an information processing device such as a computer and a word processor. The disk is generally classified into a hard disk formed from a hard base and a flexible disk formed from a flexible base. In a hard disk device using the hard disk, a floating head slider is used to float a magnetic head from a recording surface of the hard disk at a very small distance during the recording/retrieving operation. On the other hand, in a flexible disk device using the flexible disk, a magnetic head is maintained in sliding contact with the disk during the recording/retrieving operation. In the hard disk device, the hard disk is rotated at high speed. Therefore, if a solid contacts the recording surface of the disk during rotation of the disk, the recording surface will be damaged to cause destruction of information recorded. For this reason, the floating head slider is used in the hard disk device. Thus, while the hard disk has a large memory capacity, it is cumbersome to handle.

In the flexible disk device, a rotating speed of the flexible disk is lower than that of the hard disk, and a memory capacity is also smaller than the hard disk because of a larger track width. However, since the base of the flexible disk is flexible, an external force applied to the disk upon contacting or sliding of the magnetic head thereon is released by deformation of the base, thereby preventing the recording layer on the base from being damaged. That is, as compared with the hard disk, the flexible disk is easy to handle although the memory capacity is small.

Meanwhile, the information processing device has recently been made compact. For example, the use of a hand-held (laptop) computer and a personal word processor have spread. Accordingly, an external storage to be mounted in these equipments is greatly desired to be made also compact. At present, a so-called 3.5-inch diameter hard disk device or flexible (floppy) disk device is mounted in these equipments. However, it is desired to develop a flexible disk device having a large memory capacity because the hard disk device is weak against vibration or impact, and it has no compatibility of the disk.

An example of the conventional flexible disk device is disclosed in U.S. Pat. No. 3,879,757.

In the conventional flexible device, a plurality of disks cannot be mounted for recording/retrieving of information as in the hard disk device, and it is therefore hard to remarkably increase a memory capacity. Furthermore, the conventional flexible disk device is required to move a carriage for supporting a magnetic head with a high positioning accuracy, so as to provide the compatibility of the disk. Accordingly, the smaller are made a track width and a track pitch (frequency) of the disk to meet the requirement of high-density information recording, the harder is obtained the compatibility of the disk.

SUMMARY OF THE INVENTION

It is a first object of the present invention to provide a magnetic disk driving device which has a large memory capacity with a flexible disk.

It is a second object of the present invention to provide a magnetic disk driving device which has stable recording/retrieving characteristics.

It is a third object of the present invention to provide a magnetic disk driving device which may endure against an external force and improve the reliability.

It is a fourth object of the present invention to provide a magnetic disk driving device which eliminates a loading/ejecting mechanism and a carriage moving mechanism to simplify the structure and reduce the size and the weight.

It is a fifth object of the present invention to provide a magnetic disk driving device which is transportable and compatible.

According to the present invention, there is provided a magnetic disk driving device comprising a flexible disk-shaped magnetic recording medium; means for rotating said magnetic recording medium; first and second head supporting members for supporting first and second magnetic heads, respectively, said first and second head supporting members being formed with recesses from which said first and second magnetic heads project toward said magnetic recording medium; and means for moving said magnetic heads, comprising a motor for moving said magnetic heads and first and second arms extending along opposite surfaces of said magnetic recording medium, said first and second arms having respective free ends where said first and second head supporting members are mounted and having respective base ends where a rotating shaft of said motor is directly fixed; wherein said first and second arms are adapted to be rocked within a predetermined rocking angle defined in such a manner that when said first magnetic head supported by said first head supporting member is located in opposition to an outermost recording track of said magnetic recording medium, said second magnetic head supported by said second head supporting member comes to a position opposed to an innermost recording track of said magnetic recording medium.

With this arrangement, when the flexible disk is rotated, the air in the recesses of the head supporting members located on the opposite surfaces of the flexible disk is reduced during rotation of the disk to thereby suck the disk into the recesses and apply a load pressure to the magnetic heads supported in the recesses. Since the head supporting members are so located as not to be aligned to each other, the flexible disk is reliably sucked into the recesses even when an external force is applied to the magnetic disk driving device.

Further, when the rotating shaft of the motor is driven, the arms are simultaneously rocked radially of the disk to thereby move the magnetic heads. Thus, any complicated carriage moving mechanism as used in the prior art is not necessary.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment of the present invention with reference to the accompanying drawings.

Figure 1:
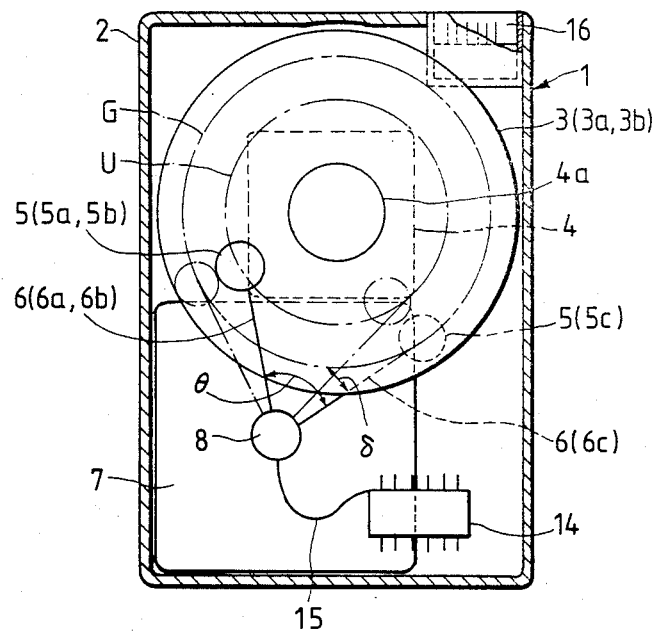
FIG. 1 is a plan view of the magnetic disk driving device of a preferred embodiment according to the present invention, showing an internal structure thereof.

Referring to FIG. 1, reference numeral 1 generally designates a magnetic disk driving device including a case 2, two flexible disks 3 (3a, 3b) mounted in the case 2, a direct drive motor (which will be hereinafter referred to as a DD motor) 4, head holder plates 5 (5a, 5b and 5c) for holding magnetic heads, holder supporting arms 6 (6a, 6b and 6c) for supporting the head holder plates 5, and a stepping motor 7 for rockably supporting the holder supporting arms 6 and moving the head holder plates 5 radially of the disks 3.

The disks 3 are of a 2-inch diameter type, and the case 2 has a width slightly greater than an outer diameter of the disks 3. The disks 3 are concentrically fixed to a rotating shaft 4a of the DD motor 4 at a position upwardly offset from the center of the case 2 as viewed in FIG. 1. The stepping motor 7 is located adjacent to the DD motor 4. A rotating shaft 8 of the stepping motor 7 extends at a position spaced from the outer circumferences of the disks 3.

Figure 4:
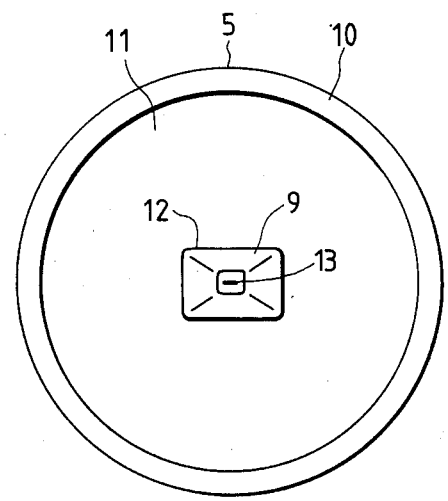
FIG. 4 is a plan view of the head supporting member and the magnetic head supported thereby.
Figure 5:
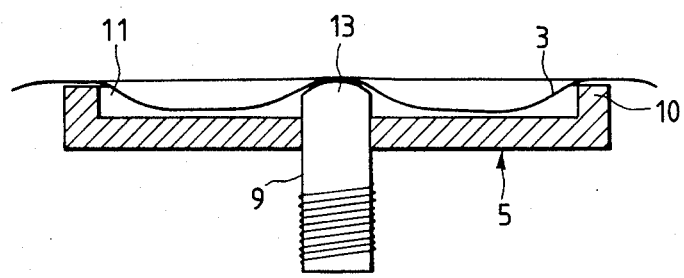
FIG. 5 is a sectional side view of the head supporting member and the magnetic disk attracted thereto.
Figure 6:
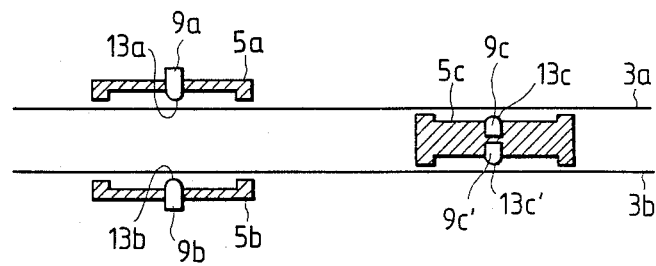
FIG. 6 is a schematic illustration of the unattracted condition of the disks.

As shown in FIGS. 4 and 5, each of the head holder plates 5 for holding the magnetic heads 9 is of a disk-like shape, and it is formed at its outer circumference with an annular projection 10, thereby forming a recess 11 surrounded by the annular projection 10. The head holder plates 5 have two different types comprising first and second holder plates 5a and 5b and a third holder plate 5c. As shown in FIG. 6, the first and second holder plates 5a and 5b each having the recess 11 on one surface thereof are arranged above the upper disk 3a and below the lower disk 3b, respectively. On the other hand, the third holder plate 5c having the recesses 11 on opposite surfaces thereof is interposed between the upper and lower disks 3a and 3b. The magnetic heads 9a and 9b held by the first and second holder plates 5a and 5b are opposed to the upper surface of the upper disk 3a and the lower surface of the lower disk 3b, respectively, while the magnetic heads 9c and 9c' held by the third holder plate 5c are opposed to the lower surface of the upper disk 3a and the upper surface of the lower disk 3b, respectively.

In this preferred embodiment, each of the holder plates 5a, 5b and 5c has an outer diameter of 7 mm, and each of the recesses 11 has an inner diameter of 6 mm and a depth of 100 $\mu$m. In mounting the magnetic heads to the head holders, each of the magnetic heads 9 is inserted into a central hole 12 formed through the holder plate 5 from the opposite side of the recess 11, and is projected from the bottom of the recess 11 by a predetermined height, e.g., about 5 $\mu$m from an upper end surface of the projection 10. Under the condition, each magnetic head 9 is fixed to the holder plate 5. Such an amount of projection of the magnetic head 9 is suitably selected according to an area of the recess 11, a rotating speed of the disk 3, the flexibility of the disk 3, etc.

Figure 2:
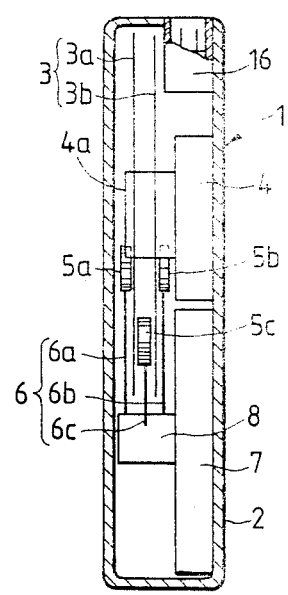
FIG. 2 is a side view of FIG. 1.
Figure 3:
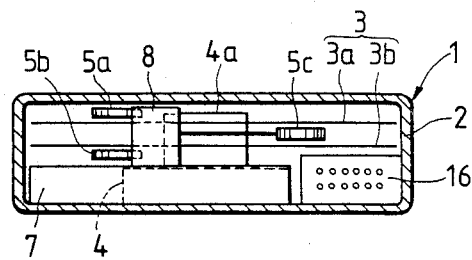
FIG. 3 is a front elevational view of FIG. 1.

The holder supporting arms 6 are formed of a rigid material, and as shown in FIGS. 2 and 3, they are constituted of a first arm 6a for supporting the first holder plate 5a on the upper side of the upper disk 3a and locating a gap 13a of the magnetic head 9a in opposition to the upper surface of the upper disk 3a, a second arm 6b for supporting the second holder plate 5b on the lower side of the lower disk 3b and locating a gap 13b of the magnetic head 9b in opposition to the lower surface of the lower disk 3b, and a third arm 6c for supporting the third holder plate 5c between the upper and lower disks 3a and 3b and locating gaps 13c and 13c' of the magnetic heads 9c and 9c' in opposition to the lower surface of the upper disk 3a and the upper surface of the lower disk 3b, respectively.

These arms 6a, 6b and 6c are directly fixed at their respective base ends to a driving shaft 8 of the stepping motor 7 in such a manner as to extend in parallel to recording surfaces of the disks 3a and 3b and not to be aligned together. In other words, as shown in FIG. 1, the first arm 6a and the second arm 6b are aligned to each other as viewed in plan, but they are not aligned to the third arm 6c. That is, the third arm 6c so extends as to define a predetermined angle $\theta$ from the first and second arms 6a and 6b, thus forming a V-shape as viewed in plan. The predetermined angle $\theta$ is set in such a manner that when the first and second head holder plates 5a and 5b come to an innermost radial position U of a data area of the disks 3a and 3b, the third head holder plate 5c comes to an outermost radial position G of the data area of the disks 3a and 3b as shown by a solid line. Accordingly, when the arms 6a, 6b and 6c are rotated together in a counterclockwise direction as viewed in FIG. 1 by the rotation of the driving shaft 8 of the stepping motor 7 until the head holder plates 5a and 5b come to the outermost radial position G of the data area, the head holder plate 5c comes to the innermost radial position of the data area as shown by an alternate long and short dash line.

The magnetic heads 9 held by the head holder plates 5a, 5b and 5c are connected to a head amplifier 14 via lead wires (not shown) extending along the arms 6a, 6b and 6c by means of a FPC 15. The head amplifier 14 is connected through a lead wire (not shown) to an external terminal 16 for connection with an equipment such as a computer or a word processor.

Under an irrotational condition of the disks 3a and 3b as shown in FIG. 6, the ends of the projections 10 of the head holder plates 5a, 5b and 5c are disposed greatly near the recording surface of the disks 3a and 3b, preferably at a spacing of 50 $\mu$m, for example.

Figure 7:
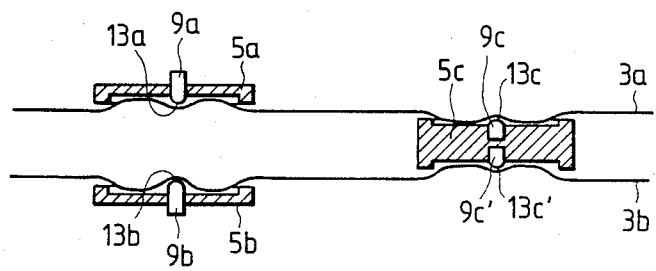
FIG. 7 is a schematic illustration of the attracted condition of the disks.

The magnetic disk driving device 1 as mentioned above is intended to be handled as one unit in itself. That is, in practically using the magnetic disk driving device 1, the external terminal 16 is connected to an external terminal of a laptop computer, for example. When the DD motor 4 is in an off state, the disks 3a and 3b are stationary, and as shown in FIG. 6, the disks 3a and 3b are separated from the head holders 5a, 5b and 5c and the magnetic heads 9a, 9b, 9c and 9c'. When the DD motor 4 is turned on, the disks 3a and 3b start to be rotated near the ends of the projections 10 of the head holder plates 5a, 5b and 5c. As a result, the air in the recesses 11 of the head holder plates 5a, 5b and 5c is extracted to reduce the pressure in the recesses 11. Accordingly, the disks 3a and 3b are drawn into the recesses 11 as shown in FIG. 7. As shown in FIG. 5, the disk 3 is deformed in accordance with a curvature of a head surface of the magnetic head 9 on which the gap 13 is formed, and accordingly, a load pressure due to a tensile force of the disk 3 is applied to the head surface of the magnetic head 9. As the condition of application of the load pressure is identical for the three head holder plates 5a, 5b and 5c, the recording/retrieving conditions are identical for the respective opposite recording surfaces of the two disks 3a and 3b, thus obtaining the stable recording/retrieving conditions.

Under the sucked condition as shown in FIG. 7, the arms 6a, 6b and 6c are rotated by the stepping motor 7 to move the magnetic heads 9 radially of the disks 3a and 3b, thus carrying out the recording/retrieving of information on/from the disks 3a and 3b. A rotative angle of the arms 6 is set within an angle $\delta$ as shown in FIG. 1 between the outermost radial position G and the innermost radial position U of the data area.

With this arrangement of the head holder plates 5a, 5b and 5c having the recesses 11, even when an external force such as an impact force is applied to the magnetic disk driving device during the recording/retrieving of information and at starting thereof, the disks 3a and 3b are prevented from moving away from the head holder plates 5a, 5b and 5c to such an extent that the disks 3a and 3b cannot be sucked since the head holder plates 5a and 5c are located on the opposite sides of the disk 3a, and the head holder plates 5b and 5c are located on the opposite sides of the disk 3b. Even if the disk 3a is moved away from the head holder plate 5a to such an extent that the disk 3a cannot be sucked, the disk 3a is moved toward the head holder plate 5c, and it is reliably sucked into the recess 11 of the head holder plate 5c to thereby stabilize the position of the disk 3a. As a result, the disk 3a is immediately sucked to the head holder plate 5a. In the case that the disk 3b is moved away from the head holder plate 5b, the same effect is obtained. Therefore, a predetermined load pressure is applied to the magnetic heads 9, so that the recording/retrieving can be stably carried out.

There will now be described a recording capacity of the magnetic disk driving device and a size of the case.

Each disk 3 is a 2-inch diameter flexible disk which is also called a still video floppy disk capable of recording information on the opposite surfaces thereof. In the case that a track pitch (frequency) of the disk 3 is set to 25 $\mu$m (1000 TPI), and that a memory capacity per track after formatted is set to 16 KB similar to a 2-inch data floppy disk, a total memory capacity on one side surface of the disk 3 having 313 tracks results in 5 MB. In this case, a head stroke of each magnetic head 9 is 0.025 $\times 312 = 7.8$ mm. Assuming that a span of each arm 6 is 25 mm, the angle $\delta$ results in about 17.5 degrees. This angle corresponds to 20 pulses of the stepping motor designed to rotate by 0.9 degrees per step, and this is attained by 16-divided (4 bits) microstep.

Assuming that a radius of the innermost track is 15 mm; a radius of the outermost track is 22.8 mm; and an outer diameter of the head holder plate 5 is 7 mm, an outer diameter of the disk 3 is as follows:

$$(15 + 7.8 + 3.5) \times 2 \approx 53 \text{ mm}$$

Further, as each disk 3 mounted in the magnetic disk driving device 1 as mentioned above is a fixed disk fixed to the rotating shaft 4a of the DD motor 4, any loading and ejecting mechanisms are not necessary, and various circuits are also not necessary in such a cartridge type disk driving device. Accordingly, an external size of the case 2 may be reduced to about $58 \times 82 \times 18$ mm, which is equal to or less than an external size of a package of cigarettes. As mentioned above, the permitted memory capacity on one side surface of each disk 3 is 5 MB, and the total permitted memory capacity of the two disks 3a and 3b in the preferred embodiment therefore results in 20 MB, which is the same capacity as obtained in the conventional hard disk device including two hard disks. That is, such a large memory capacity as obtained in the conventional hard disk device can be obtained by the compact floppy disk device having a size equal to or less than that of a package of cigarettes.

As described above, the magnetic disk driving device of the preferred embodiment exhibits the following advantages.

(1) A large recording capacity can be obtained since the magnetic heads are so located as to be opposed to the opposite surfaces of the two disks 3.

(2) As the head holder plates located on the opposite sides of the disk 3 function to mutually prevent the disk 3 from excessively separating from the head holder plates, the disk 3 may be reliably sucked into the recesses of the head holder plates, thereby exhibiting the stable recording/retrieving characteristics.

(3) As the disks 3 are not exposed to the outside of the case 2 as compared with a disk cartridge, there is no possibility that the disks 3 are contacted by any outside objects and that dusts or the like enter the case 2, thereby increasing a service life.

(4) As the disks 3 are flexible, there is no possibility that the recording layers on the disks 3 are broken upon contacting of the magnetic heads 9 as in the hard disk device, thereby improving the reliability.

(5) As a loading/ejecting mechanism and a carriage moving mechanism are not necessary, the structure of the device may be simplified, thereby making the device compact and lightweight.

(6) In relation to the advantages mentioned in Paragraphs (4) and (5), the device is transportable and compatible as different from the hard disk device, thereby making the device be easy to use.

Figure 8:
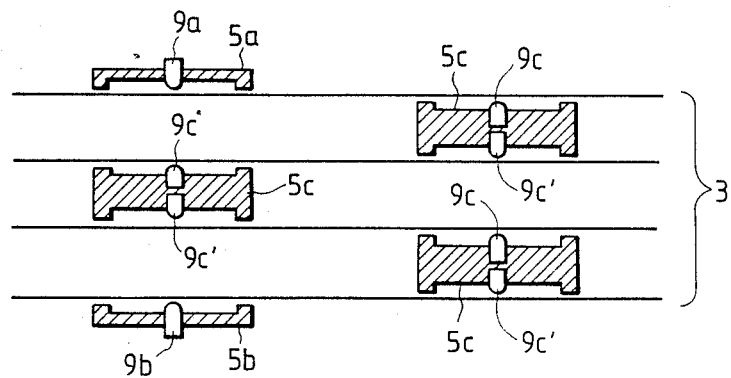
FIG. 8 is a schematic illustration similar to FIG. 6, showing another preferred embodiment of the present invention using four disks.

Although the magnetic disk driving device in the preferred embodiment includes the two disks 3, it may include a plurality of disks more than two (three disks are shown in FIG. 8) in the same manner as the preferred embodiment, so as to increase the memory capacity. In such a case, only the thickness of the case 2 is merely increased in accordance with the number of disks 3 to be stacked, and the device may be basically made compact.

Referring to FIG. 8, the same or corresponding parts as in the previous preferred embodiment are designated by the same reference numerals. It is preferable to preliminarily write servo information on any one of the disks 3 to be mounted in the magnetic disk driving device, e.g., on an uppermost disk or a lowermost disk and carry out feedback control according to the servo information read, thereby ensuring a moving accuracy of the magnetic heads 9 ( 9a, 9b, 9c, 9c').

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magnetic disk driving device comprising:
   a flexible disk-shaped magnetic recording medium having two sides and being disposed so that the medium can be rotated;
   a pair of magnetic heads for recording information on and/or retrieving information from said magnetic recording medium during rotation of said magnetic recording medium; and
   a pair of head holder plates disposed adjacent to said recording medium each supporting one of said magnetic heads, each of said head holder plates having a recess formed therein facing said recording medium and surrounding the magnetic head which it supports such that said magnetic head projects toward said magnetic recording medium from said recess,
   wherein said head holder plates are described as aligned on opposite sides of said recording medium when a line perpendicular to a surface of a side of the magnetic recording medium passes through the recess or the magnetic head on one side of the recording medium while at the same time passing through the recess or the magnetic head on an other side of the recording medium,
   wherein said magnetic heads are located on opposite sides of said magnetic recording medium at positions such that said head holder plates are not aligned on opposite sides of said recording medium.

2. A magnetic disk driving device as in claim 1, further comprising a case for completely enclosing at least all of the apparatus recited in claim 1.

3. A magnetic disk driving device comprising:
   a plurality of flexible disk-shaped magnetic recording media each disk having two sides and being disposed so that the media can be rotated;
   a plurality of magnetic heads for recording information on and/or retrieving information from said magnetic recording media during rotation of said magnetic recording media;
   a plurality of first head holder plates disposed adjacent to a first side of at least one disk of said recording media each plate supporting one of said magnetic heads, each of said first head holder plates having a recess formed therein facing said first side of said at least one disk and surrounding the magnetic head which it supports such that said magnetic head projects toward said first side of said disk from said recess; and
   a plurality of second head holder plates formed and disposed so that they are adjacent to a second side of two adjacent disks of said recording media each supporting two of said magnetic heads, one facing said second side of a first of said two disks and an other facing said second side of a second of said two disks, each of said second head holder plates having a pair of recesses formed therein on opposite side surfaces, each recess facing one of said second sides of said said two adjacent disks and surrounding the magnetic head which it supports such that one magnetic head projects toward each of said two adjacent disks from each of said recesses;
   wherein said head holder plates are described as aligned on opposite sides of a disk when a line perpendicular to a surface of a side of a disk passes through the recess or the magnetic head on one side of the disk while at the same time passing through the recess or the magnetic head on an other side of the disk,
   wherein said magnetic heads are located on opposite sides of each one of said plurality of disks at positions such that said first and second head holder plates are not aligned on opposite sides of any one disk.

4. A magnetic disk driving device as in claim 3, further comprising a case for completely enclosing at least all of the apparatus recited in claim 2.

5. A magnetic disk driving device comprising:
   a flexible disk-shaped magnetic recording medium having a top and a bottom surface opposite to each other;
   spinning means for rotating said magnetic recording medium;
   a first and a second head holder plate for supporting a first and a second magnetic head, respectively, adjacent to said magnetic recording medium, said first and said second head holder plates having recesses formed therein surrounding said magnetic head from which said first and said second magnetic heads project toward said magnetic recording medium; and
   swinging means for moving said magnetic heads comprised of,
      a motor for moving said magnetic heads, and
      a first and a second arm each extending along one of said opposite surfaces of said magnetic recording medium, said first and said second arms each having a free end where said first and said second head holder plates are mounted and each having a base end to which a rotating shaft of said motor is directly fixed;
   wherein said first and said second arms are adapted to be rocked within a predetermined rocking angle defined in such a manner that when said first magnetic head supported by said first head holder plate is located adjacent to an outermost recording track of said magnetic recording medium, said second magnetic head supported by said second head holder plate is located at a position adjacent to an innermost recording track of said magnetic recording medium.

6. A magnetic disk driving device as in claim 5, further comprising a case for completely enclosing at least all of the apparatus recited in claim 3.

* * * * *